US 6,694,746 B2

(12) United States Patent
Reed et al.

(10) Patent No.: US 6,694,746 B2
(45) Date of Patent: Feb. 24, 2004

(54) MICRO VOLUME ACTUATOR FOR AN AIR TURBINE STARTER

(75) Inventors: William H. Reed, Gilbert, AZ (US); John L. Doak, Tempe, AZ (US); Jimmy D. Wiggins, Chandler, AZ (US); Ronald J. Louis, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/071,351

(22) Filed: Feb. 6, 2002

(65) Prior Publication Data

US 2003/0145603 A1 Aug. 7, 2003

(51) Int. Cl.⁷ .............................................. F02C 7/268
(52) U.S. Cl. ......................................... 60/787; 137/488
(58) Field of Search ................................. 251/305, 306, 251/30.01, 30.02; 60/787; 137/488

(56) References Cited

U.S. PATENT DOCUMENTS

| 2,189,475 A | * | 2/1940 | Saur | 123/389 |
| 2,993,496 A | | 7/1961 | Ackley | 137/34 |
| 3,200,591 A | * | 8/1965 | Ray | 60/432 |
| 3,433,251 A | | 3/1969 | Avant | 137/488 |
| 3,769,998 A | | 11/1973 | Avant | |
| 4,585,172 A | | 4/1986 | Gazzera | 239/265.33 |
| 4,617,958 A | | 10/1986 | Seidel et al. | 137/429.5 |
| 4,702,273 A | | 10/1987 | Allen, Jr. et al. | 137/487.5 |
| 4,768,555 A | | 9/1988 | Abel | 137/627.5 |
| 4,805,873 A | | 2/1989 | Mouton | 251/31 |
| 4,903,578 A | | 2/1990 | Terp | 91/499 |
| 4,914,906 A | | 4/1990 | Burch | 60/39.142 |
| 5,267,433 A | | 12/1993 | Burch | 60/39.142 |
| 5,315,817 A | | 5/1994 | Vannini et al. | 60/39.091 |
| 5,365,210 A | | 11/1994 | Hines | 335/238 |
| 5,389,910 A | | 2/1995 | Abel | 335/278 |
| 5,435,125 A | | 7/1995 | Telakowski | 60/39.142 |
| 5,463,865 A | | 11/1995 | Smith | 60/39.142 |
| 5,499,651 A | | 3/1996 | Gallo et al. | 137/334 |
| 5,752,383 A | | 5/1998 | Rominek | 60/407 |
| 5,779,217 A | * | 7/1998 | Lucas et al. | 251/30.01 |
| 6,211,665 B1 | | 4/2001 | Ahrendt et al. | 324/207.16 |
| 6,240,246 B1 | | 5/2001 | Evans | 388/814 |

* cited by examiner

Primary Examiner—Ehud Gartenberg
(74) Attorney, Agent, or Firm—Robert Desmond, Esq.

(57) ABSTRACT

An air turbine starter system and air turbine starter valve that has a microvolume actuator to prevent the connected butterfly valve from opening too quickly. Air turbine starter valves can in some circumstances freeze shut, but may be opened by normal actuator operation. Such operation may open the valve too quickly due to stored potential energy. A sharp pressure transient may be inflicted upon the connected air turbine starter which can cause damage. The microvolume actuator air turbine starter system set forth herein allows generation of sufficient force to break ice and move the valve while minimizing stored potential energy that could open the valve too quickly.

21 Claims, 7 Drawing Sheets

MICRO VOLUME ACTUATOR FOR AN AIR TURBINE STARTER

BACKGROUND OF THE INVENTION

1. Field of the Invention

This invention relates to actuators for controlling valves to air turbine starters and more particularly to a microvolume actuator that prevents rapid opening of the air turbine starter valve when partially frozen closed.

2. Description of the Related Art

Air turbine type starter motors operate with the energy of a compressed gas such as air and are often used for starting a turbine engine, such as that used on aircraft. The compressed air for the air turbine starter is controlled by a starter valve, such as a pressure regulating and shut-off butterfly valve, or a shut-off valve.

A source of relatively clean dry air is required to power the air turbine starter. The most common source of air for this purpose are an auxiliary power unit, bleed air from the compressor stage of another operating gas turbine engine, or a gas turbine ground cart. Upon actuation of the engine start switch, the starter valve is energized and opens at a controlled rate to permit air to flow to the air turbine starter. The air turbine starter valve output air flow engages the air turbine starter motor, which converts the energy in the air to torque. This torque is applied to the engine gearbox which is then accelerated to a predetermined cut off speed whereupon the engine can accelerate to idle. The start cycle may be terminated manually by the pilot opening the start switch or automatically by a speed sensitive switch built into the starter or by a main engine speed signal to a fully automated digital engine controller (FADEC). When the start cycle is terminated, the starter valve is closed cutting off the energy to the air turbine starter. When starting air is cut off, the air turbine starter automatically disengages from the engine accessory drive shaft and comes to a stop.

The starter valve controls the output torque of the air turbine starter by means of a controlled opening rate of the valve, a controlled closing rate, and/or a pressure regulating system which delivers substantially constant pressure to the starter regardless of the upstream air pressure. These functions in a conventional starter control valve may be implemented by mechanical-pneumatic control devices such as orifices, needle valves, springs and diaphragms. While such devices are generally acceptable, these devices are complex in design and manufacture, may be difficult to adjust, and may be sensitive to environmental changes and may have poor repeatability under certain circumstances.

The starter control valve controls the pressure of the starter air that is initially supplied to the air turbine starter to prevent destructive shock to the mechanism. As the starter responds, the rate of increase in air (fluid) pressure is typically progressive to effect a smooth, rapid acceleration of the starter's turbine mechanism. In addition, the control valve may serve to regulate air pressure.

While a control valve of this type is generally acceptable, it is difficult for the valve to simultaneously regulate pressure, limit pressure rise rate, and control the speed of the air turbine starter. It is also difficult for the valve to meet strict performance requirements over a wide range of environmental conditions.

When the valve is opened, the relatively large air volume present in the actuator that controls the valve increases in pressure and becomes a reservoir of potential energy. This pressure is usually relatively small to prevent damage to the engine being started. However, when ice is in the start control valve, the valve may initially stick until the actuator develops enough torque to break the ice and open the valve. When this occurs, the pressure behind the valve may force the air into the engine in a generally uncontrolled manner. This initial high pressure spike can damage the air turbine starter, as well as the main engine gearbox.

As shown in FIG. 1, an air turbine starter valve actuator 100 is shown connected to a butterfly plate 202 by a butterfly shaft 102. Pressurized air 206 enters into the duct 204 but is held back by the closed butterfly plate 202. A probe 110 feeds the air flow into the actuator 100. A regulator orifice 112 controls volume and pressure flow into the actuator 100.

To close the plate 202, inlet pressure is ported through the butterfly shaft actuator in-bleed orifice 110 and routed to an inner chamber 116 through the regulator orifice 112. With the solenoid valve 120 de-energized as shown, a larger diameter chamber 124 is pressurized through a transmission orifice 126 so that the larger diameter chamber 124 is generally at the same pressure as the inner chamber 116. A second smaller diameter chamber 130 is continually vented to ambient by an associated vent 132. The resulting pressure differential across the diaphragm 144 sealing the smaller diameter chamber 116 produces an actuator force that assists the torsion spring 142 to close the butterfly plate 202 and to keep it closed.

The transmission orifice 126 is sized to control the rate of pressure change on the larger diameter chamber 124. This produces a controlled time for the closing of the valve.

With the solenoid de-energized as shown in FIG. 1, the inlet pressure is routed simultaneously to the inner chamber 116 and the larger diameter chamber 124 through the regulator orifice 112 and the transmission orifice 126, respectively. The matching of the regulator orifice 112 and the transmission orifice 126 to the volume flow time requirements of the inner chamber 116 and the larger diameter chamber 124 prevents self-opening of the butterfly plate 202 during rapid inlet pressure rate rises.

The actuator 100 opens when the solenoid 120 is energized. The valve ball 150 seats itself in the valve seat 152 generally approximate to the transmission orifice 126. Actuator supply pressure is then vented from the larger diameter chamber 124 to ambient through the valve vent 154. Due to the effective area of the larger diaphragm 140 relative that to the smaller diaphragm 144, the resulting actuator force will overcome the closing torsion spring force to open the butterfly plate 202 and keep it open. The valve vent 154 is adjustable and appropriately sized to control the rate of pressure decay in the larger perimeter chamber 124 to produce a controlled rate of downstream pressure rise during the opening of the butterfly plate 202.

As is common with some valves, the butterfly plate 202 may be opened manually by inserting a square drive tool in the end of the butterfly shaft and rotating the shaft to open the butterfly plate 202. Normal operation is reestablished by rotating the tool to the closed position.

Valves such as the one shown in FIG. 1 generally serve to open, close, and control the connected butterfly plate 202 so long as conditions are not severe. However, should the butterfly plate 202 become obstructed, the energy stored in the chambers of the actuator 100 may over-power the obstruction and the butterfly plate 202, causing the butterfly plate 202 to open too quickly and without a gentle transition from unpressurized air flow to pressurized air flow. Such pressure transitions, or transients, may damage the associated air turbine starter (ATS) and engine gearbox. Damage to the ATS may shorten its useful life and prevent its full and proper operation. In particular, once the ice fails, the butterfly valve is free to open and may do so by snapping open and quickly transmitting a pressure gradient on the order of 2000 psi/second to the air turbine starter.

Damage to an ATS can be especially inconvenient, because it may prevent the starting of an engine on the ground and delay the flight for the replacement of the turbine starter. Additionally, in those rare instances where an in-flight air turbine starting is needed, a damaged air turbine starter can impact the proper operation of the starting procedure affecting aircraft safety. As the starting of the gas turbine engine associated with the air turbine starter is of significant importance, the integrity and operation of the air turbine starter is of similar importance. Consequently, an ATS valve is needed that will prevent damage caused by pressure transients due to icing or other obstructions is desired. The present invention satisfies this need.

SUMMARY OF THE INVENTION

The present invention prevents damage to air turbine starters and related gas turbine gearboxes by preventing the generation of sharp air pressure transients from ice-obstructed or otherwise obstructed valves.

Most actuators use a relatively large volume of pressurized air to actuate the coupled butterfly valve. While such actuators do work, they also store a significant amount of stored energy in the form of pressurized air. If the associated valve is temporarily obstructed as by ice, air pressure builds until enough force is brought to bear on the obstruction until it fails. Once the failure occurs and the valve is able to pivot to its open position, it may do so violently or sharply under the pent-up force present in the actuator.

The present invention allows both the generation of sufficient force to break obstructive ice or the like while also simultaneously allowing for immediate dissipation of that force once the valve is free to open. By using a small (or micro) volume, the present invention uses air pressure to generate valve-opening forces but avoids the detrimental side effects of larger volume actuators.

Other features and advantages of the present invention will become apparent from the following description of the preferred embodiment(s), taken in conjunction with the accompanying drawings, which illustrate, by way of example, the principles of the invention.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
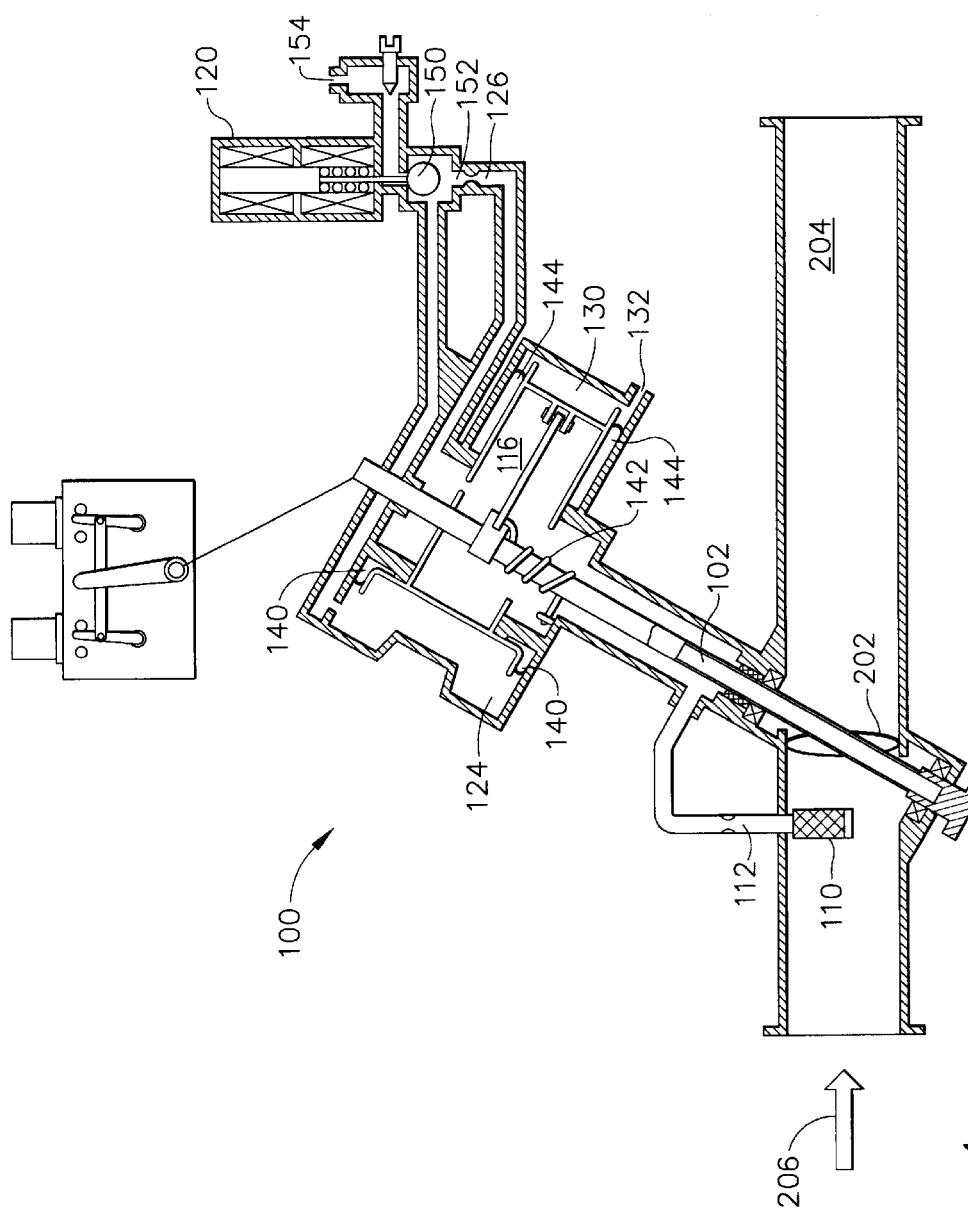
FIG. 1 shows a schematic and cutaway view of a prior art air turbine starter valve actuator.
Figure 2:
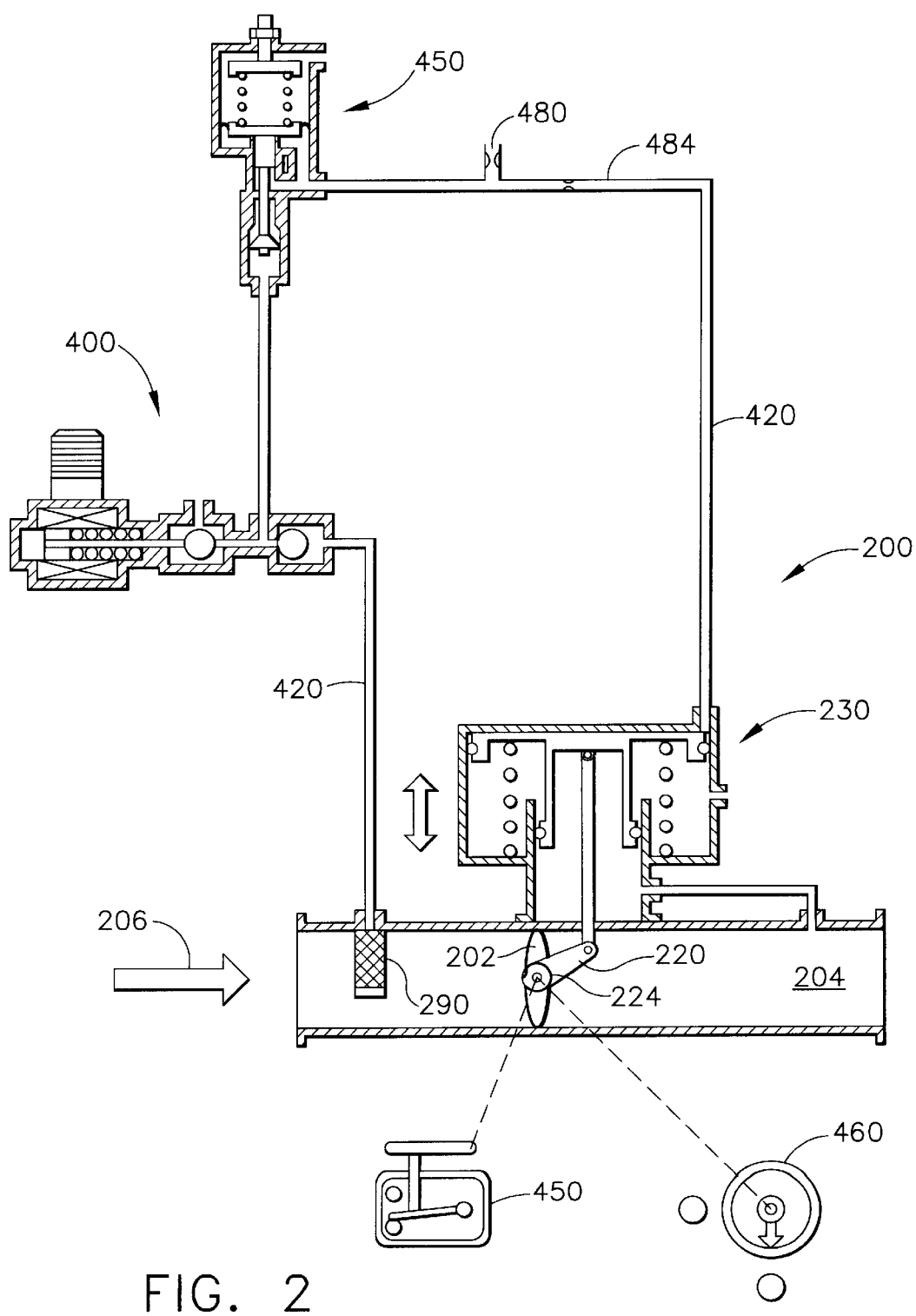
FIG. 2 shows a schematic and cutaway view of the microvolume actuator starter control valve system of the present invention. Position switches and a manual override and visual position indicator are also shown.
Figure 5:
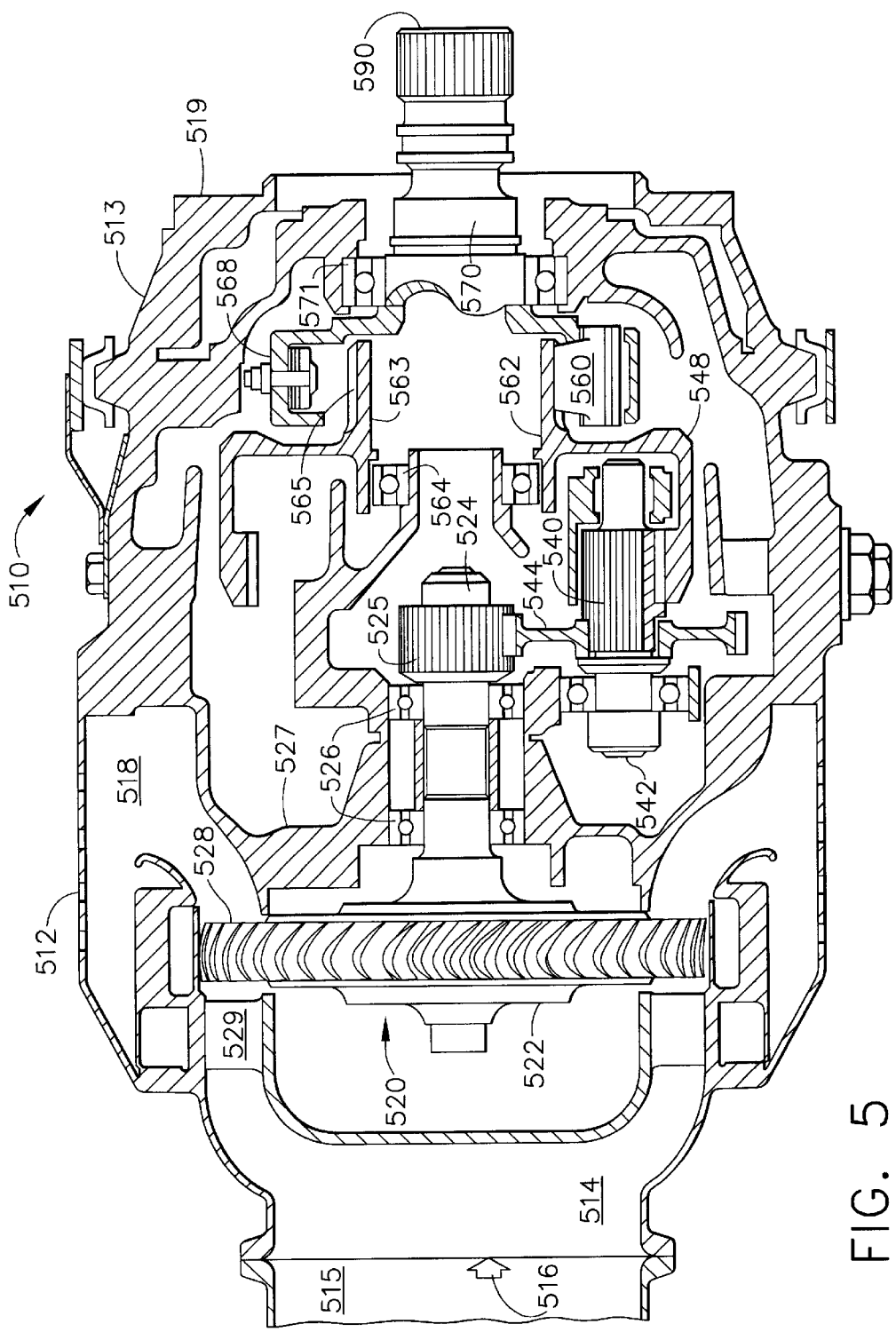
FIG. 5 is a plan cross-sectional view of a Honeywell air turbine starter having the designation ATS 100.
Figure 6:
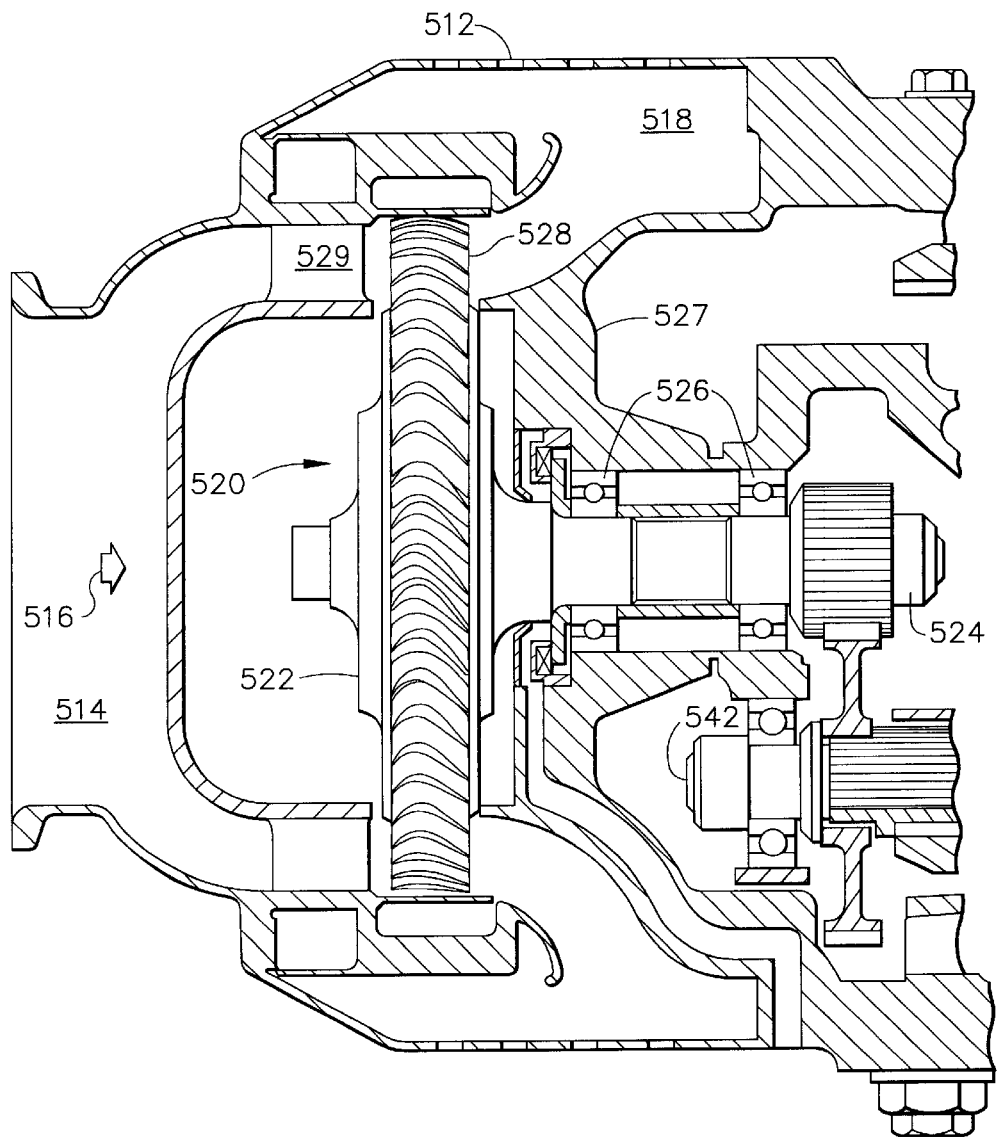
FIG. 6 is a blow-up of the turbine section of the air turbine starter of FIG. 5.

As shown in FIG. 2, the microvolume actuator starter control valve 200 of the present invention has a butterfly plate 202 positioned in a duct 204 for the control of pressurized air flow 206 to an air turbine starter such as that shown in FIGS. 5 and 6. The opening and closing of the butterfly plate 202 serves to allow the air flow 206 past it and on to the engine starter. Initially, the valve is closed (as shown in FIG. 1) and the valve opens by rotating about a central sealed shaft 208 until it is perpendicular to its position as shown in FIG. 1 in the same plane. The butterfly plate 202 is generally circular in nature or otherwise has a perimeter conforming to the inner geometry of the duct 204. In some embodiments, the butterfly plate 202 may be at an angle with respect to the main axis of the duct 204. A lever arm 220 extends outwardly towards the microvolume actuator 230 and provides a moment arm upon which torque can be applied about the central sealed shaft 208 and consequently upon the butterfly plate 202. A torsion spring 224 and a closing spring 242 in the microvolume actuator 230 urge the butterfly plate 202 into the closed position in conjunction with the unpressurized actuator, about which more is described below.

As shown in FIG. 2, the microvolume actuator 230 is placed with respect to the butterfly plate 202 so that it applies sufficient torque upon the valve to open it. The butterfly plate 202 may break through temporary obstructions, including frozen moisture or otherwise, that may be broken through by the normal operation of the microvolume actuator 230. As the depiction shown in FIG. 2 may be vertical, horizontal, or otherwise, it can be seen that the microvolume actuator 230 can also be so oriented. Any relative geometry of the microvolume actuator 230 may be advantageously realized and is within the contemplation of the present invention.

Figure 3:
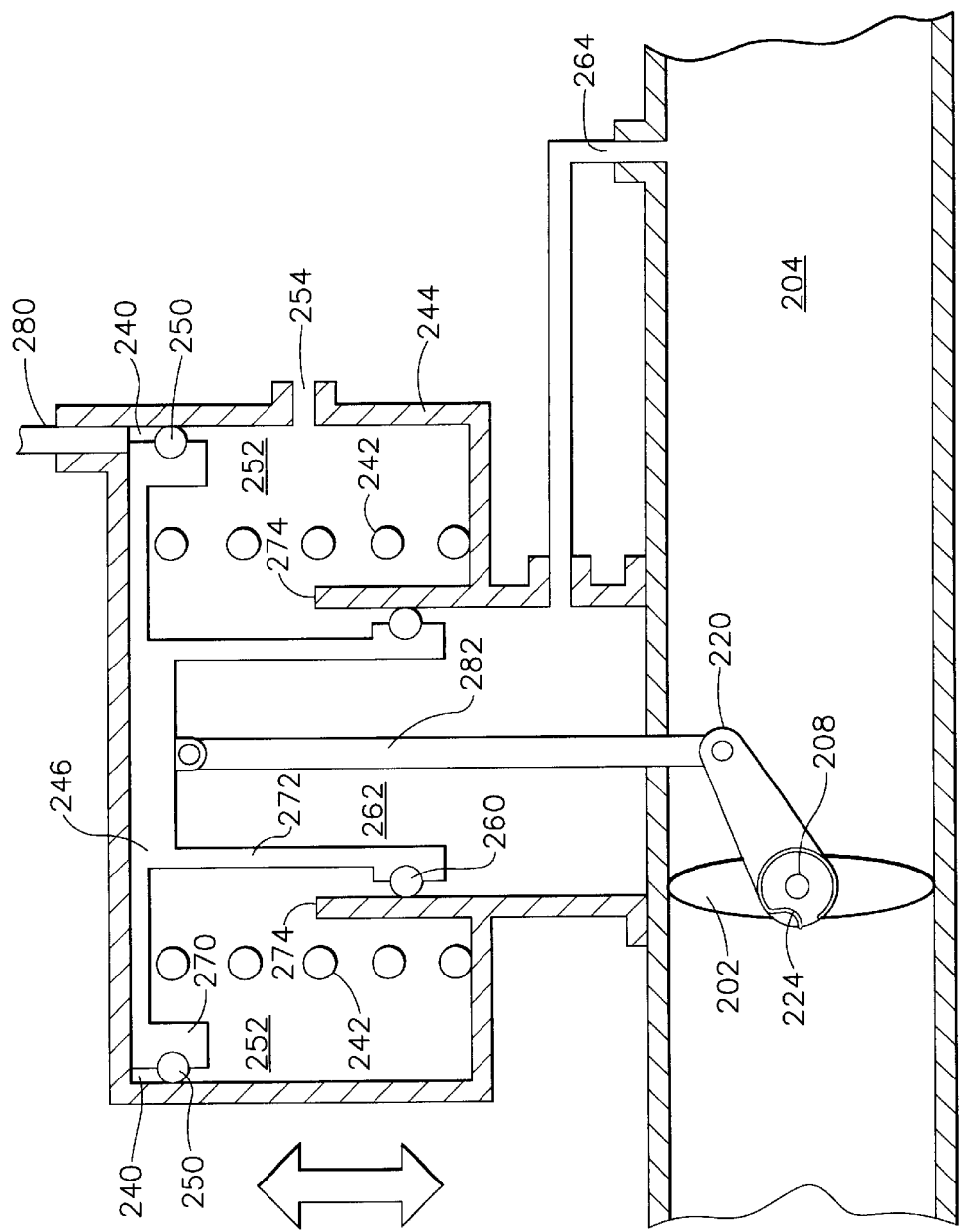
FIG. 3 is an enlargement of the microvolume actuator shown in FIG. 2.

As shown in FIGS. 2 and 3, the microvolume actuator 230 is shown in schematic cross section. When rotated one hundred eighty degrees (180°) about the actuator rod 282, the viewer will have a better appreciation of the three-dimensional construction of the microvolume actuator 230.

Referring now to FIG. 3, the microvolume actuator 230 defines three chambers. A primary or opening chamber 240 is ultimately coupled to the pressurized airflow 206. The pressure within the opening chamber 240 creates a force (pressure times area equals force) that serves to press against the closing spring 242 and the lever arm 220 connected to the butterfly plate 202. The actuator housing 244 serves to define the three chambers while providing support for the piston 246 as it travels through the housing. An opening chamber dynamic seal 250 serves to sealingly separate the opening chamber 240 from the spring chamber 252. The opening chamber seal 250 translates with the piston 246 as it travels through the housing 244. The spring chamber 252 is vented to ambient through the spring chamber vent 254.

The piston chamber guide 260 provides a dynamic seal, serving to seal and separate the piston chamber 262 from the spring chamber 252. The piston chamber guide 260 helps to prevent abrasion between the inner toroidal flange 272 of the piston 246 and the inner cylinder wall 274 of the actuator housing 244. The piston chamber guide 260 also serves as a guiding and centering mechanism for the piston 246. The piston chamber 262 is vented through the piston chamber vent 264 upstream of the butterfly plate 202.

As shown in FIG. 3, the piston 246 has an outer toroidal flange 270 that engages the opening chamber seal 250 and moves parallel to the actuator housing 244. The inner toroidal flange 272 extends downwardly within a cylinder defined by an inner upwardly-extending wall 274 extending from the actuator housing 244. The closing spring 242 is held in place by the outer toroidal flange 270 and is trapped between the flange 270 and the housing 244. The inner toroidal flange 272 engages the inner cylinder wall 274 with the interface between the two sealed by the piston chamber guide 260.

When the microvolume actuator 230 is pressurized by the air flow 206, air under pressure flows into the opening chamber 240 along passages 420 and via the inlet 280. The opening chamber 240 is then pressurized and force is exerted upon the piston 246. When the pressure inside the opening chamber 240 is sufficient to overcome the selected set point of closing spring 242, the piston 246 begins to move downwardly within the actuator housing 244. This causes the actuator rod 282 to translate with respect to the actuator housing 244. The pivotably attached lever arm 220 is also forced at its distal end to translate with the actuator rod 282. This exerts a torque on the butterfly plate 202, urging the valve open. Air that is present within the spring chamber 252 and the piston chamber 262 exits through the respective vents 254, 264. Likewise, the vents 254, 264 allow the ingress of air into the respective chambers when the closing spring 242 pushes the actuator piston 246 to its non-pressurized position.

The downward travel of the actuator piston 246 may be obstructed by the upper end of the inner cylinder wall 274. The displacement provided by the actuator piston 246 should generally match that needed to take the butterfly plate 202 from its closed to its full open position. When the pressure from the air flow 206 is removed, the closing spring 242 urges the piston 246 to its shown position (FIGS. 2 and 3), closing the butterfly plate 202.

Having described above the butterfly valve system 200 and the microvolume actuator 230, description is made below of the pressurization system by which the microvolume actuator 230 is pressurized in a regulated manner. The air flow 206 serves as the pressure source for the microvolume actuator 230, and the transmission of the pressurized air 206 is provided in a controlled manner so that smooth and shock-limiting operation of the butterfly plate 202 is achieved.

Referring now to FIG. 2, when pressurized air flow 206 is impressed upon the closed butterfly plate 202, the pressure backs up and will attempt to flow through any available path. A downstream-facing probe 290 provides an open path by which pressurized air can flow to the microvolume actuator 230. Pressurized air travels into the probe 290. The pressurized air then encounters a solenoid control valve 400. The solenoid 402 controls the operation of the accompanying valve mechanism 404.

Figure 4:
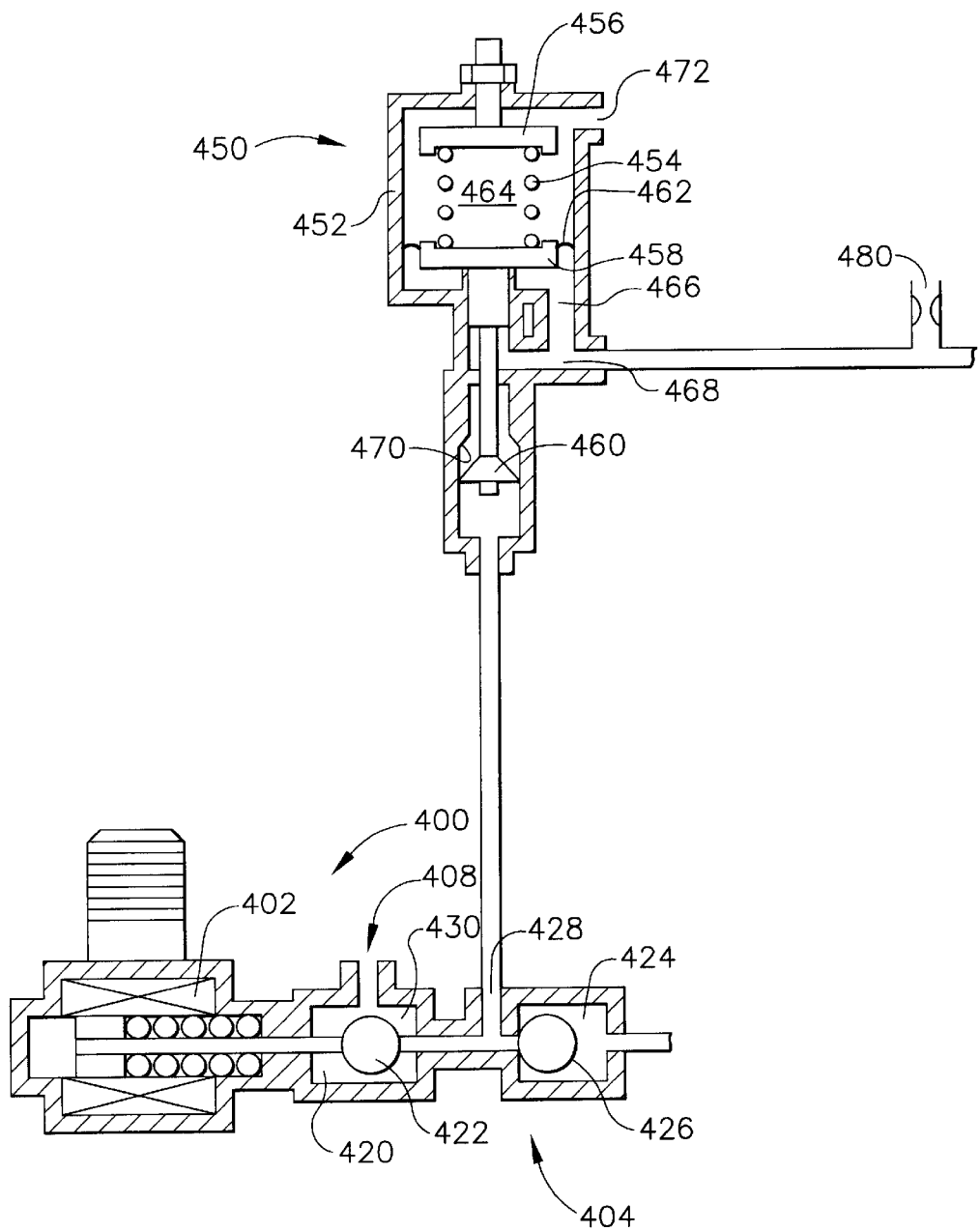
FIG. 4 is an enlargement of the solenoid valve and reference pressure regulator shown in FIG. 2.

Referring now to FIG. 4, the solenoid control valve 400 allows pressurized air 206 to flow past the valve mechanism 404 when energized and allows such pressurized air to reach the microvolume actuator 230. Otherwise, and when the solenoid control valve 400 is de-energized, it prevents such pressurized air from reaching the microvolume actuator 230 and vents the microvolume actuator 230 to ambient via vent 408. Solenoid spring 406 urges the valve mechanism 404 shut when the solenoid 402 is not energized, and vent 408 then allows the discharge of pressurized air to ambient in a controlled fashion.

The valve mechanism shown in FIG. 4 is sometimes referred to as a "ball-and-a-half" system, as it is in modification of the well-known double ball system. Instead of both balls always seating themselves against the respective left and right (according to FIG. 4) openings, when one of the chambers is closed by one ball, the other ball is disposed generally centrally to its corresponding chamber. This is shown in FIG. 4 where the vent chamber 420 has its ball 422 positioned centrally within the chamber while the shut off chamber 424 has its ball 426 sealing the opening 428 to the microvolume actuator 230.

When the solenoid 402 is activated, the vent ball 422 lodges against its valve seat 430 in order to shut off the vent 408. The shut-off ball 426 is then positioned centrally to the shut-off chamber 424 allowing air to enter into the shut-off chamber and travel on to the microvolume actuator 230. The use of a double ball valve would defeat this purpose, as the shut-off chamber 424 would always be closed and would prevent air flow to the microvolume actuator 230.

When pressurized air flows from the downstream probe 290 to the open valve 400, the pressurized air is then transmitted or passed on to a reference pressure regulator 450. The reference pressure regulator takes incoming air at a certain pressure, in this case approximately 50 pounds per square inch gauge (50 psig), and transmits the air onward at a reduced pressure. This reduced pressure is predictable and regulable, such that incoming air at a first certain pressure can be transmitted on and at a second certain pressure within certain tolerances for both the incoming and out flowing air. As shown in FIG. 4, the reference pressure regulator 450 has a housing 452 within which a calibration spring 454 is held between an adjustable regulator plate 456 and a slidable poppet plate 458. The calibration spring 454 is adjustable at the regulator plate 456 so as to apply a certain force upon the slidable poppet plate 458 and the attached poppet 460. A diaphragm or other sealing member 462 serves to seal the spring chamber 464 from the sensing chamber 466.

The spring chamber 464 is vented to ambient through the vent 472. The sensing chamber 466 is coupled to the pressurized air flow downstream of the poppet 460 via the sensing chamber channel 468. The poppet 460 can seat itself against the valve seat 470 in order to fully shut off the microvolume actuator 230 from the pressurized air flow. However, the advantage of the reference pressure regulator 450 is in the controlled transmission of pressurized air flow past the poppet 460 and on to the microvolume actuator 230.

When pressurized air encounters the poppet 460, the air pressure on either side of the regulator diaphragm 462 is at ambient as vented through the valve vent 408. The calibration spring 454 easily unseats the poppet 460 from its valve seat 470 to allow air flow to flow past the poppet 460. The poppet 460 provides some obstruction to the air flow 206, such air flow then flowing past the regulator 450 but in doing so also flowing into the sensing chamber 466.

If such air flow is above ambient, the pressure then pushes the diaphragm 462 and the slidable plate 458 against the spring 454. In so doing, the calibration spring 454 is compressed according to the pressure applied, moving the poppet 460 towards the valve seat 470. The greater the pressure, the more the poppet 460 is moved towards the seat 470 and the air flow and air pressure transmitted past the regulator 450 is diminished.

As shown in FIG. 2, the transmission of air pressure on to the microvolume actuator 230 is further complemented by the bleed orifice 480 and the opening and closing rate orifice 484. The bleed orifice 480 may allow the venting of pressurized air to ambient as well as the release of any contaminants in the lines. The opening/closing rate orifice 484 prevents pressure changes from being too quickly impressed upon the microvolume actuator 230. Correspondingly, the depressurization or return of the microvolume actuator 230 to its closed position is limited by the egress of air from the microvolume actuator 230 through the opening/closing rate orifice 484.

As shown in FIG. 3, the microvolume actuator 230 limits the power, but not the initial force, that is applied to the butterfly plate 202. The microvolume actuator 230 provides an extremely small volume by which the butterfly plate 202 can be opened. The reason for this is shown in contrast to the prior art actuator shown in FIG. 1. As described above, the prior art actuator shown in FIG. 1 has a large volume with which to power the opening of the butterfly plate 202. Should the butterfly plate 202 be obstructed, the stored energy inside the microvolume actuator 100 is first built up by the obstructed butterfly plate 202 then quickly released as the actuator (FIG. 1) is then free to transmit its energy on to the butterfly plate 202. This results in a very high transient pressure imposed upon the connected air turbine starter (FIGS. 5 and 6) and engine gearbox. Such a high pressure transient commonly injures and damages the air turbine starter (ATS) and engine gearbox and is an operating condition to be avoided in order to allow for a longer and less costly useful life of the ATS.

The microvolume actuator 230 of the present invention generally has a very small volume provided by the opening chamber 240. So, generally, the opening chamber 240 has a volume of approximately two one-thousandths of a cubic inch (0.002 in.$^3$). As the force or torque applied on the butterfly plate 202 by the microvolume actuator 230 is related only to the pressure of the incoming air (twenty pounds per square inch/20 psi) as well as the area of the actuator (nine and fifty-nine one-hundredths square inches/ 9.59 in.$^2$), the energy stored in the microvolume actuator 230 due to an obstructed butterfly plate 202 is minimized. This reduces the potential injury to the attached air turbine starter/ATS.

Additionally, the microvolume actuator 230 uses the piston chamber 262 as a closing chamber. This closing chamber 262 is vented to the duct 204 by a closing chamber vent 264. In coupling the piston chamber or closing chamber 262 to the duct 204, any pressure present in the duct 204 is transmitted to the closing chamber 262 and serves to oppose any force or pressure present on the opposite side of the piston 246. Coupled with the restoring spring, or closing spring 242, the piston 246 is held in balance by the forces and pressures on either side of it.

Initially, the closing spring 242 holds the piston against the upper portion of the housing 244. This keeps the butterfly valve 242 closed. When pressurized air flow 206 is introduced into the system, it is obstructed by the butterfly plate 202 and flows on to the microvolume actuator 230 via the probe 290 through the valve 400 and the pressure regulator 450. The initial restoring force of the spring 242 is then opposed by the incoming regulated pressure of the air flow 206. Once the butterfly plate 202 opens, the duct space downstream of the butterfly plate 202 is also filled with pressurized air, which is transmitted to the closing chamber 262 via the vent 264.

As the available volume to store potential energy in the microvolume actuator 230 is on the order of 2/1000ths of a cubic inch, and as the surface area of the piston 246 is approximately 9.59 square inches (giving rise to a radius of approximately 1.75 inches or a diameter of approximately 3.5 inches), the displacement made by the piston 246 and the microvolume actuator 230 is approximately 2/10,000ths of an inch (0.00020 in.).

The force (torque) contributed by the spring is anticipated as being approximately 12 inch-pounds for a 36 pound closing spring. The closing chamber 262 is foreseen as having an effective area of 3.52 square inches. The force generally applied upon the piston 246 by airflow at 20 pounds per square inch (20 psi) is approximately 191.8 pounds The opposing force supplied by the pressurized closing chamber 262 for air pressure at approximately 50 pounds per square inch (50 psi) is approximately 105.6 pounds Consequently, when the system is fully pressurized and generally at equilibrium, the 191.8 pounds opening force is balanced by 36 pounds of closing spring force plus 176 pounds of closing chamber force. In combination, the closing forces are approximately 212 pounds, while the opening force is approximately 191.8 pounds Of course, the opening of the butterfly plate 202 arises from an equilibrium of forces on the piston 282. These balanced forces may cause the butterfly plate 202 to float in an open position on the shaft 208 due to the feedback between the opening chamber 240 and the closing chamber 262. Preferably, the butterfly plate 202 opens in a manner to yield an opening rise rate of no more that approximately 30 psi/second.

In operation, the air flow 206 approaches the butterfly plate 202 and pressurizes the lines 420 incoming to the microvolume actuator 230. If the solenoid valve 400 is closed, no further air pressure is transmitted from the probe 290 and the microvolume actuator 230 is vented to ambient through the chamber vent 408. The reference pressure regulator 450 is fully opened as balanced at ambient as the regulator is also vented to ambient on both sides of the diaphragm 462 via the sensing chamber vent 472 and the valve vent 408. Upon opening of the valve 400, the valve vent 408 is isolated by the vent chamber ball 422, and the path between the probe 490 and the pressure regulator 450 is opened by the unseating of the shut-off ball 426 from its valve seat.

Pressurized air flow 206 is then transmitted on to the pressure regulator which then restricts the initial air flow, generally at 50 psi, to 20 psi. This air flow is then transmitted past the bleed orifice 480 and opening/closing rate orifice 484 and on to the microvolume actuator 230 via the inlet 280 thereto. The initial 20 psi flow rate is initially restricted by the opening/closing rate orifice 484 to allow gradual pressure to build up in the microvolume actuator 230. The restoring force of the closing spring initially holds the piston 246 shut, but as pressure builds up in the opening chamber 240, this initial force is overcome when the pressure inside the opening chamber 240 reaches approximately 3.75 pounds per square inch (3.75 psi). The restoring force of the closing spring 242 begins then to be overcome by the increasing pressure in the opening chamber 240. Due to the small volume available for storage of potential energy in the form of air pressure in the microvolume actuator 230, coupled with the opening/closing rate orifice 484, the build up of potential compressed air energy in the microvolume actuator 230 is limited, should the butterfly plate 202 be obstructed and not open once the air pressure in the opening chamber 240 exceeds the closing force of the closing spring 242.

Assuming that the butterfly plate 202 is obstructed and that pressure and potential energy must build up in the microvolume actuator 230, such pressure and build up approaches the limit of 20 psi which is the pressure limit of the incoming pressurized air supply to the microvolume actuator 230. Approximately 190 pounds of microvolume actuator force is only balanced by the 36 pounds of the closing spring 242 and the force from the obstructed plate 202.

At the point where the pressure and resulting force of that pressure is sufficient to overcome both the force of the closing spring 242 and the obstruction, such as ice, holding the butterfly plate 202 closed, the obstruction of the butterfly plate 202 generally fails catastrophically to quickly release the butterfly plate 202 from its obstruction. The butterfly plate then becomes freely rotatable and the energy stored in the opening chamber 240 of the microvolume actuator 230 is then immediately freed to turn the butterfly plate 202 but without the previous restriction or obstruction by the ice or other material holding the butterfly plate 202 closed.

Normally, and in prior art actuators, this would cause the butterfly plate 202 to snap open very quickly and to allow a sharp transient pressure wave to be quickly transmitted down the duct 204 to the air turbine starter/ATS. As mentioned above, this generally causes damage or injury to the air turbine starter and generally does so with certainty if repeated over a number of period of times. One can appreciate this problem with jets flying in Artic or Antarctic latitudes during humid weather.

The microvolume actuator 230 inhibits or prevents such air pressure injuries to the air turbine starter by limiting the angular displacement of the butterfly plate 202 once the obstruction has catastrophically failed. Generally, the force brought to bear upon the butterfly plate 202 by the pressurized air 206 is limited in duration and quickly dissipated to prevent the full opening of the butterfly plate 202 in a quick, snap-like event. Due to the small volume available for the storage of potential energy in the opening chamber 240, the release of the butterfly plate 202 by the obstruction causes the piston 246 to descend within the actuator housing 244, thereby rapidly increasing the relative volume of the opening chamber 240.

This increase in volume rapidly but temporarily diminishes the pressure inside the opening chamber 240. The decrease in pressure inside the opening chamber 240 reduces proportionally the force brought to bear upon the butterfly plate 202. This reduction in pressure in the opening chamber 240 is not immediately replenished by available air flowing through the unit 280 to the opening chamber 240. Instead, the opening/closing rate orifice 484 restricts the free flow of pressurized air into the opening chamber 240. This allows the microvolume actuator 230 of the present invention to both provide sufficient force to overcome obstructions holding the butterfly plate 202 closed without causing the plate 202 to open too quickly, thereby inflicting damaging air pressure transients upon the air turbine starter/ATS.

The stored energy inside the opening chamber 240 may even cause the piston 246 to temporarily pull a small vacuum on inlet 280 and on the air flow coming into the opening chamber 240 as the momentum initially provided to the piston 246 may carry it past equilibrium and cause a sharp decrease in pressure. This slight vacuum would then also act as a restoring force to prevent the piston 246 from descending further within the microvolume actuator housing 244. Additionally, once the butterfly valve 242 is open, the restoring or closing force of the closing spring 242 is augmented by the pressurized closing chamber 262 as the pressurized air flowing past the butterfly valve is then transmitted to the closing chamber 262 by the closing chamber vent 264.

Once the air turbine has been started by the accompanying air turbine starter, the microvolume actuator 230 and associated valving system have served their purpose and can now be closed in order to shut down the air turbine starter/ATS. A solenoid valve 400 may then be closed to vent the microvolume actuator 230 to ambient when the air flow 206 ceased. The butterfly plate 202 then closes, and the operation of the associated air turbine is self-sustaining. The microvolume actuator 230 for the air turbine starter valve 200 is then available for restarting the engine either in-flight or on the ground.

In order to provide better operation and confidence in the status of the microvolume actuator air turbine starter valve 200 of the present invention, position switch enunciators 450 and a manual override and visual position indicator 460 are provided. The position switches 450 allow automatic feedback of the operational state of the air turbine starter valve 200 and the butterfly plate 202. The manual override and visual position indicator 460 allows manual operation of the ATS valve 200 while simultaneously providing visual indication as to the open or closed nature of the butterfly plate 202.

The microvolume actuator air turbine starter control valve 200 is generally connected to an air turbine starter. FIGS. 5 and 6 shows one such air turbine starter 510 that could be used in conjunction with the microvolume actuator air turbine starter control valve and embodying the present invention. The air turbine starter 510 has a first housing assembly 512 and a second housing assembly 513. The housing assembly 512 defines a flow path 514 extending from an inlet 516 to an outlet 518. The housing assembly 513 includes a mounting flange 519 for mounting the air turbine starter to an aircraft engine (not shown). An air pressure duct 515 delivers pressurized air from an air supply to the inlet 516. Typically, the air pressure at the inlet 516 is in the range of 30–40 psig.

Within the air turbine starter 510, the housing assemblies 512 and 513 support a turbine section 520, a compound planetary gear train 540, and an overrunning clutch 560.

The turbine section 520 is comprised of a turbine wheel 522 having a rotatable shaft 524 extending therefrom, journaled by bearings 526 to a turbine exhaust housing 527, which is part of housing 512. A gear 525 secured to the shaft 524. A plurality of turbine blades 528 are circumferentially mounted to the turbine wheel 522 and are positioned within the flow path 514. Upstream of the blades 528 are a plurality of nozzles 529 mounted to the housing assembly 512 which provide the proper flow angle to the air flow before it enters the turbine blades 528. In operation, pressurized air entering through inlet 516 is properly aligned by the nozzles 529 and is then expanded across the blades 528 before exiting through outlet 518. The blades 528 convert the pressure energy of the air into rotary motion causing the turbine wheel 522, the shaft 524 and the gear 525 to rotate at the same speed as the blades 528.

The compound planetary gear train 540 is comprised of a plurality of shafts 542 each having a gear 544 that meshes with the gear 525. The gear 544 engages a portion of the shaft 542, a ring gear 548 and a hub gear 562, which is the input side of the overrunning clutch 560. In operation, the gear train 540 converts the high speed, low torque output of the turbine section 520 into low speed, high torque input for the clutch 560.

The clutch 560 is a pawl and ratchet type clutch, although other types of clutches may be substituted. The clutch 560 has the hub gear 562 on its input side and a clutch drive shaft 570 on its output side. The hub gear 562 has a hollow cylindrical hub portion 563, which is supported on a bearing 564 and has a ratchet 565 circumferentially positioned along its external surface. Adjacent to the hub gear 562 is a hollow drive shaft assembly comprising a clutch housing 568 integral with a clutch drive shaft 570, and mounted on bearing 571 for rotation. A portion of the drive shaft 570 extends beyond the housing 513 and has an air turbine starter output shaft 590 mounted thereon. The output shaft 590 can be coupled, for example, to a starter pad on the gearbox of a gas turbine engine (not shown). The ATS could be used to start gas turbine engines used in a variety of applications, including without limitation aerospace, marine, land vehicle applications, and power generation.

The microvolume actuator air turbine starter control valve 200 controls the air flow to the air turbine starter 510 and allows its operation through the energy provided by the compressed air.

Figure 7:
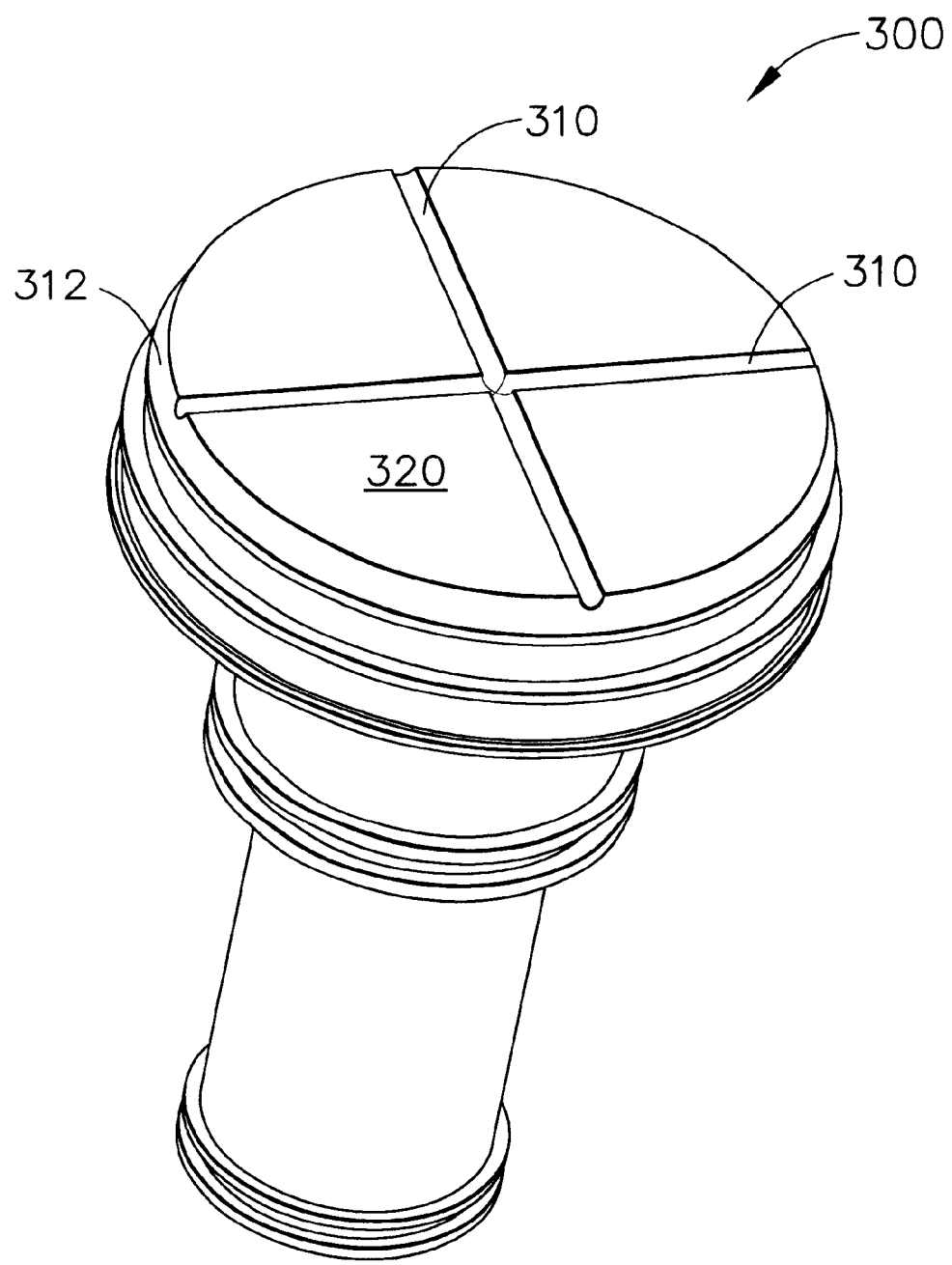
FIG. 7 is a top perspective view of a channeled piston for use in the microactuator of the present invention.

FIG. 7 shows a piston 300 that may be advantageously used in the microvolume actuator 230 of the present invention. To allow for better distribution of air about and through the opening chamber 240, channels 310 are present across the piston 300. Beveling 312 around the piston 300 forms a channel with the housing 244 also provides for air and pressure distribution. When air enters into the opening chamber 230, pressure is equally distributed within the opening chamber 230 even though the top 320 of the piston is flat against the top of the opening chamber 230. This prevents initial torque from arising upon the piston 300 as pressure is equally distributed across it.

It can be seen that the actuator and ATS system described herein overcomes the previous problems associated with prior ATS systems such as that shown in FIG. 1. Generally, the ATS system set forth herein may serve to replace such prior actuators to work on ATS systems now known or developed in the future.

The embodiments of the present invention described above provide industrial applicability by providing one or more of the following benefits or uses. In particular, an air turbine starter valve is provided that may overcome the obstruction provided by ice. The ATS valve is more reliable and will require less maintenance. Because of this, aircraft turbine engines tend to be more easily started and require less maintenance. Flights are able to take off on time more often. Greater safety is achieved as mid-air restarting of a gas turbine engine is less likely to be disabled by air starter valves that are frozen shut.

The actuator and ATS system described herein advantageously provides an air turbine starter valve system that minimizes injuries to associate air turbine starters. The actuator also advantageously provides an air turbine valve system that minimizes generation of sharp air pressure transients that can injure air turbine starters. Additionally, the actuator advantageously provides a microvolume actuator that uses a small volume to generate air turbine starter valve opening forces while minimizing the storing of pent up potential energy in the form of compressed gas.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. An air turbine starter valve for controlling start air flow to an air turbine starter, the valve comprising:

A valve body with an interior surface defining an inlet, an outlet and a passageway therebetween for start air flow;

A valve gate mounted in the passageway for movement between an open and a closed position;

An actuator operably coupled to the valve gate, the actuator including:

A housing having an internal surface;

A piston slidably mounted within the housing to move between a first position and a second position, whereby the piston has an upper surface cooperatively defining a chamber with the housing, the chamber being variable in volume depending on the location of the piston, but having a smaller volume when the piston is in its first position; and An opening in the housing to provide fluid communication to the chamber;

A regulator mechanism operatively connected to the opening in the housing to selectively provide air flow to the chamber, and An arm mechanism operatively connected between the piston to the valve gate; and Wherein the volume of the chamber is less than 0.1 cubic inches when the piston is in the first position.

2. The air valve of claim 1, wherein the volume of the chamber is less than 0.05 cubic inches when the piston is in the first position.

3. The air valve of claim 1, wherein the volume of the chamber is less than 0.003 cubic inches when the piston is in the first position.

4. The air valve of claim 1, wherein the volume of the chamber is approximately 0.002 cubic inches when the piston is in the first position.

5. The air valve of claim 1, wherein the upper surface of the piston defines at least one groove extending from a position near to the opening of the housing when the piston is in the first position.

6. The air valve of claim 5, wherein the upper surface of the piston defines at two intersecting grooves, one groove extending from a position near to the opening of the housing when the piston is in the first position.

7. The air valve of claim 6, wherein the upper surface of the piston is beveled about its perimeter to form a circumferential air channel with the housing when the piston is in the first position.

8. An air turbine starter valve for controlling start air flow to an air turbine starter, the valve comprising:

A valve body with an interior surface defining an inlet, an outlet and a passageway therebetween for start air flow;

A valve gate mounted in the passageway for movement between an open and a closed position;

An actuator operably coupled to the valve gate, the actuator including:

A housing having an internal surface;

A piston slidably mounted within the housing to move between a first position and a second position, whereby the piston has an upper surface cooperatively defining a chamber with the housing, the chamber being variable in volume depending on the location of the piston, but having a smaller volume when the piston is in its first position; and An opening in the housing to provide fluid communication to the chamber;

A regulator mechanism operatively connected to the opening in the housing to selectively provide air flow to the chamber, and An arm mechanism operatively connected between the piston to the valve gate; and Wherein the upper surface of the piston defines at least one groove extending from a position near to the opening of the housing when the piston is in the first position.

9. The air turbine starter valve of claim 8, wherein the upper surface of the piston defines at two intersecting grooves, one groove extending from a position near to the opening of the housing when the piston is in the first position.

10. The air valve of claim 9, wherein the upper surface of the piston is beveled about its perimeter to form a circumferential air channel with the housing when the piston is in the first position.

11. An air turbine starter system comprising:
   An air turbine starter including:
      A housing defining an opening for accepting drive air flow;
      A turbine mechanism mounted in the housing in a position to receive the drive air flow;
      A gear box operatively connected to the turbine mechanism;
      An output shaft operatively connected to the gear box; and
      A clutch assembly connected to the output shaft;
   A valve body with an interior surface defining an inlet, an outlet and a passageway therebetween for start air flow;
   A valve gate mounted in the passageway for movement between an open and a closed position;
   An actuator operably coupled to the valve gate, the actuator including:
      A housing having an internal surface;
      A piston slidably mounted within the housing to move between a first position and a second position, whereby the piston has an upper surface cooperatively defining a chamber with the housing, the chamber being variable in volume depending on the location of the piston, but having a smaller volume when the piston is in its first position; and
      An opening in the housing to provide fluid communication to the chamber;
   A regulator mechanism operatively connected to the opening in the housing to selectively provide air flow to the chamber, and
   An arm mechanism operatively connected between the piston to the valve gate;
   Wherein the volume of the chamber is less than 0.1 cubic inches when the piston is in the first position.

12. An air turbine starter valve actuator comprising:
   A housing having an internal surface;
   A piston slidably mounted within the housing to move between a first position and a second position, whereby the piston has an upper surface cooperatively defining a chamber with the housing, the chamber being variable in volume depending on the location of the piston, but having a smaller volume when the piston is in its first position;
   An opening in the housing to provide fluid communication to the chamber;
   A regulator mechanism operatively connected to the opening in the housing to selectively provide air flow to the chamber; and
   An arm mechanism operatively connected between the piston to the valve gate;
   Wherein the volume of the chamber is less than 0.1 cubic inches when the piston is in the first position.

13. The air valve of claim 12, wherein the volume of the chamber is less than 0.05 cubic inches when the piston is in the first position.

14. The air valve of claim 12, wherein the volume of the chamber is less than 0.003 cubic inches when the piston is in the first position.

15. The air valve of claim 12, wherein the volume of the chamber is approximately 0.002 cubic inches when the piston is in the first position.

16. The air valve of claim 12, wherein the upper surface of the piston defines at least one groove extending from a position near to the opening of the housing when the piston is in the first position.

17. The air valve of claim 16, wherein the upper surface of the piston defines at two intersecting grooves, one groove extending from a position near to the opening of the housing when the piston is in the first position.

18. The air valve of claim 17, wherein the upper surface of the piston is beveled about its perimeter to form a circumferential air channel with the housing when the piston is in the first position.

19. An air turbine starter valve actuator comprising:
   A housing having an internal surface;
   A piston slidably mounted within the housing to move between a first position and a second position, whereby the piston has an upper surface cooperatively defining a chamber with the housing, the chamber being variable in volume depending on the location of the piston, but having a smaller volume when the piston is in its first position;
   An opening in the housing to provide fluid communication to the chamber;
   A regulator mechanism operatively connected to the opening in the housing to selectively provide air flow to the chamber;
   An arm mechanism operatively connected between the piston to the valve gate; and
   Wherein the upper surface of the piston defines at least one groove extending from a position near to the opening of the housing when the piston is in the first position.

20. The air turbine starter valve actuator of claim 19, wherein the upper surface of the piston defines at two intersecting grooves, one groove extending from a position near to the opening of the housing when the piston is in the first position.

21. The air valve of claim 20, wherein the upper surface of the piston is beveled about its perimeter to form a circumferential air channel with the housing when the piston is in the first position.

* * * * *